US006839338B1

(12) United States Patent
Amara et al.

(10) Patent No.: US 6,839,338 B1
(45) Date of Patent: Jan. 4, 2005

(54) METHOD TO PROVIDE DYNAMIC INTERNET PROTOCOL SECURITY POLICY SERVICE

(75) Inventors: Satish Amara, Mount Prospect, IL (US); Madhvi Verma, Schaumburg, IL (US)

(73) Assignee: UTStarcom Incorporated, Alameda, CA (US)

(*) Notice: Subject to any disclaimer, the term of this patent is extended or adjusted under 35 U.S.C. 154(b) by 197 days.

(21) Appl. No.: 10/101,641

(22) Filed: Mar. 20, 2002

(51) Int. Cl.[7] ................................................. H04Q 7/24
(52) U.S. Cl. ........................................................ 370/338
(58) Field of Search ................................ 370/338, 400, 370/401; 455/410, 432.1, 432.3, 433, 435.1, 436, 437–438, 439, 442; 713/152, 164–171, 200; 709/227, 228, 229, 225

(56) References Cited

U.S. PATENT DOCUMENTS

| | | | | |
|---|---|---|---|---|
| 6,055,236 A | | 4/2000 | Nessett et al. | 370/389 |
| 6,167,513 A | * | 12/2000 | Inoue et al. | 713/150 |
| 6,170,057 B1 | * | 1/2001 | Inoue et al. | 713/153 |
| 6,195,705 B1 | * | 2/2001 | Leung | 709/245 |
| 6,240,514 B1 | * | 5/2001 | Inoue et al. | 713/153 |
| 6,253,321 B1 | | 6/2001 | Nikander et al. | 713/160 |
| 6,330,562 B1 | | 12/2001 | Boden et al. | 707/10 |
| 6,466,964 B1 | * | 10/2002 | Leung et al. | 709/202 |
| 6,507,908 B1 | * | 1/2003 | Caronni | 713/153 |
| 6,539,483 B1 | * | 3/2003 | Harrison et al. | 713/201 |
| 6,542,992 B1 | * | 4/2003 | Peirce et al. | 713/153 |
| 6,643,776 B1 | * | 11/2003 | Boden et al. | 713/200 |
| 6,668,282 B1 | * | 12/2003 | Booth et al. | 709/224 |
| 2002/0114469 A1 | * | 8/2002 | Faccin et al. | 380/270 |

OTHER PUBLICATIONS

Gloria Tuquerres et al., "Mobile IP: Security &Application", Dec. 01, 1999, Telematics Systems and Services—Centre for Telematics and Information Technology University of Twente.*
"The Internet Key Exchange (IKE)," Internet Engineering Task Force Request for Comment 2409, Harkins et al., Nov. 1998.
"Security Properties of the IPsec Protocol Suite," Internet Engineering Task Force IP Security Working Group Draft, A. Krywaniuk, Jul. 2001, <draft–krywaniuk–ipsec–properties–00.txt>.
"Minimal Encapsulation within IP," Internet Engineering Task Force Request for Comment 2004, C. Perkins, Oct. 1996.
"The OAKLEY Key Determination Protocol," Internet Engineering Task Force Request for Comment 2412, H.K. Orman, Nov. 1998.
"IP Mobility Support," Internet Engineering Task Force Request for Comment 2002, C. Perkins, Oct. 1996.

(List continued on next page.)

*Primary Examiner*—Dang Ton
*Assistant Examiner*—Tri H. Phan
(74) *Attorney, Agent, or Firm*—McDonnell Boehnen Hulbert & Berghoff LLP

(57) ABSTRACT

A mobile node may roam away from its home network to a foreign network. The mobile node may communicate using the Mobile Internet Protocol, and it may use Internet Protocol security to communicate with its home network. A foreign agent on the foreign network and a home agent on the home network may dynamically link a policy to be used for a Internet Protocol security session between the foreign agent and the home agent. The foreign agent and the home agent may dynamically create a filter to be used for the Internet Protocol Security session.

29 Claims, 7 Drawing Sheets

OTHER PUBLICATIONS

"IP in IP Tunneling," Internet Engineering Task Force Request for Comment 1853, W. Simpson, Oct. 1995.

"IP Encapsulation within IP," Internet Engineering Task Force Request for Comment 2003, C. Perkins, Oct. 1996.

"Security Architecture for the Internet Protocol," Internet Engineering Task Force Request for Comment 2401, Kent et al., Nov. 1998.

"IP Authentication Header," Internet Engineering Task Force Request for Comment 2402, Kent et al., Nov. 1998.

"IP Encapsulating Security Payload (ESP)," Internet Engineering Task Force Request for Comment 2406, Kent et al., Nov. 1998.

"Internet Security Association and Key Management Protocol ("ISAKMP")," Internet Engineering Task Force Request for Comment 2408, Maughan et al., Nov. 1998.

"Use of IPSec in Mobile IP," Internet Engineering Task Force IP Security Working Group Draft, Zao, et al., Nov. 1997, <draft–ietf–mobileip–ipsec–use–00.txt>.

"Packet Classification Using Tuple Space Search," Srinivasan, et al., undated.

"Mobile IP," C. Perkins, undated.

International Search Report for PCT/US03/08800 mailed Jul. 2, 2004.

* cited by examiner

METHOD TO PROVIDE DYNAMIC INTERNET PROTOCOL SECURITY POLICY SERVICE

FIELD OF THE INVENTION

The present invention relates generally to network communications. More specifically, it relates to a method for providing dynamic Internet Protocol policy service.

BACKGROUND OF THE INVENTION

A mobile node may use the Mobile Internet Protocol ("Mobile IP") to roam away from its home network, and the mobile node may establish a connection with a foreign network. The mobile node may securely communicate with its home network using a protocol such as Internet Protocol security ("IPsec"). IPsec may be used communicate between a Foreign Agent ("FA") and a Home Agent ("HA"). The FA can receive packets from the mobile node. The FA can then use IPsec, for example, to encrypt the packets from the mobile node and forward them through the virtual tunnel to the HA. The HA may then receive the packets and decrypt them to retrieve the original message. A similar process may be used to send packets from the HA to the FA, which can ultimately be routed to the mobile node.

In IPsec, a policy may be defined for a mobile node corresponding to a particular FA-HA pair. The policy generally specifies parameters for IPsec communication between the FA and the HA when the mobile node roams to the FA's network. The policy may be defined and stored by the HA, and a corresponding policy may be defined and stored by the FA. When a packet travels through the virtual tunnel, the FA and HA can use their respective policies to apply the appropriate IPsec parameters in processing that packet.

In order to allow the mobile node to roam to different foreign networks and to continue to communicate with its HA using IPsec, a policy can be configured for each possible FA-HA pair that the mobile node can use. The policies created for the FA-HA pairs should be stored by the HA and also by the corresponding FA. Adding additional FAs that can be accessed by the mobile node increases the number of FA-HA pairs that need to be created. Additionally, when the policies are created, the IP address, or other identifier, of the FA and HA needs to be known. This method for defining FA-HA pairs is not easily scalable, and can require a large amount of time to create and store all the possible FA-HA pairs.

In addition to storing a policy for each FA-HA pair, the FA and the HA both store a filter corresponding to each possible FA-HA pair. The filters can be stored in a filter list, and they can be used to determine if a packet should receive IPsec processing. For example, when the FA or HA receives a packet, the FA or HA can search its filter list to determine if there is a filter corresponding to that packet. If there is a filter, then the FA or HA can apply IPsec processing to the packet, for example by using a policy defined for that FA-HA pair and mobile node.

A FA or HA may each store a large number of filters corresponding to many FA-HA pairs, and therefore its filter list may also be large. When a packet arrives at a FA or HA, the FA or HA searches through its filter list to determine whether to apply policy service to the packet. Searching through a large filter list can be a time-consuming and computationally intensive process, and it may slow the speed with which the FA or HA can process the packet.

Therefore, there exists a need for a new and improved way to provide policy service in an IPsec environment.

SUMMARY OF THE INVENTION

In accordance with preferred embodiments of the present invention, some of the problems associated with Internet Protocol security communications are overcome. A method for providing dynamic Internet Protocol security policy service is provided.

One aspect of the invention includes a method for dynamically linking a policy to be applied to an Internet Protocol Security session between a foreign agent and a home agent. The policy can be applied to packets sent between the foreign agent and the home agent. The foreign agent may dynamically link to a policy when it establishes an Internet Protocol security session with the home agent, and the home agent may dynamically link a policy when it establishes an Internet Protocol security session with the foreign agent.

Another aspect of the invention includes a method for dynamically creating a filter to be applied to an Internet Protocol security session between the foreign agent and the home agent. The foreign agent may dynamically create a filter than can be used to identify packets that receive Internet Protocol security processing. The home agent can also create a filter that identifies packets that receive Internet Protocol security processing. The filter may be removed from a list of active filters when the IPsec session between the foreign agent and the home agent ends.

These as well as other aspects and advantages of the present invention will become apparent from reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF PREFERRED EMBODIMENTS

Mobile Internet Protocol

Many different devices can connect to a network and exchange data, and various types of networks may be used to connect devices. For example, one or more computers may connect to a local area network ("LAN"). Then, the computers connected to the LAN can exchange data across the network. In another example, a wireless device may connect to a cellular wireless network. The wireless device may then communicate with other devices connected to the wireless network.

One or more networks may also be linked together, and a device connected to one network can communicate with a device connected to another network. For example, a LAN may provide connectivity to the Internet through an Internet Service Provider ("ISP"). Likewise, a cellular wireless network may provide connectivity to the public switched telephone network ("PSTN") or to a packet data serving node ("PDSN"), such as the Internet. Once the networks are connected to the Internet, or to another network, a device on one network can exchange data with a device on another connected network. For example, a wireless device on a cellular network could connect to a device on the PSTN or to a device on the Internet.

A network generally supports one or more communication protocols. A communication protocol generally provides a format for exchanging data between the devices on the network, and more than one protocol may be used during a communication session. In addition to providing a format for exchanging data between devices on the same network, a communicate protocol may provide a format for exchanging data between devices connected to different networks.

For example, the Transmission Control Protocol ("TCP") and the Internet Protocol ("IP") may be used to send data between devices on the same or on different networks. TCP is a connection-oriented protocol used to send data over a network, such as the Internet. TCP is commonly used in conjunction with IP, and they provide a format for breaking a data message into packets, transmitting the packets over one or more networks to a receiver, and reassembling the packets at the receiver to form the original data message.

IP can be used to send data between devices on the same network and between devices on different networks. For IP communications, a device is generally assigned a 32-bit IP address. The IP address is generally globally unique across the connected networks, and this allows the destination device to be uniquely identified by its IP address. Data is transmitted in an IP packet. The IP packet includes a header portion and a data portion.

Figure 1:
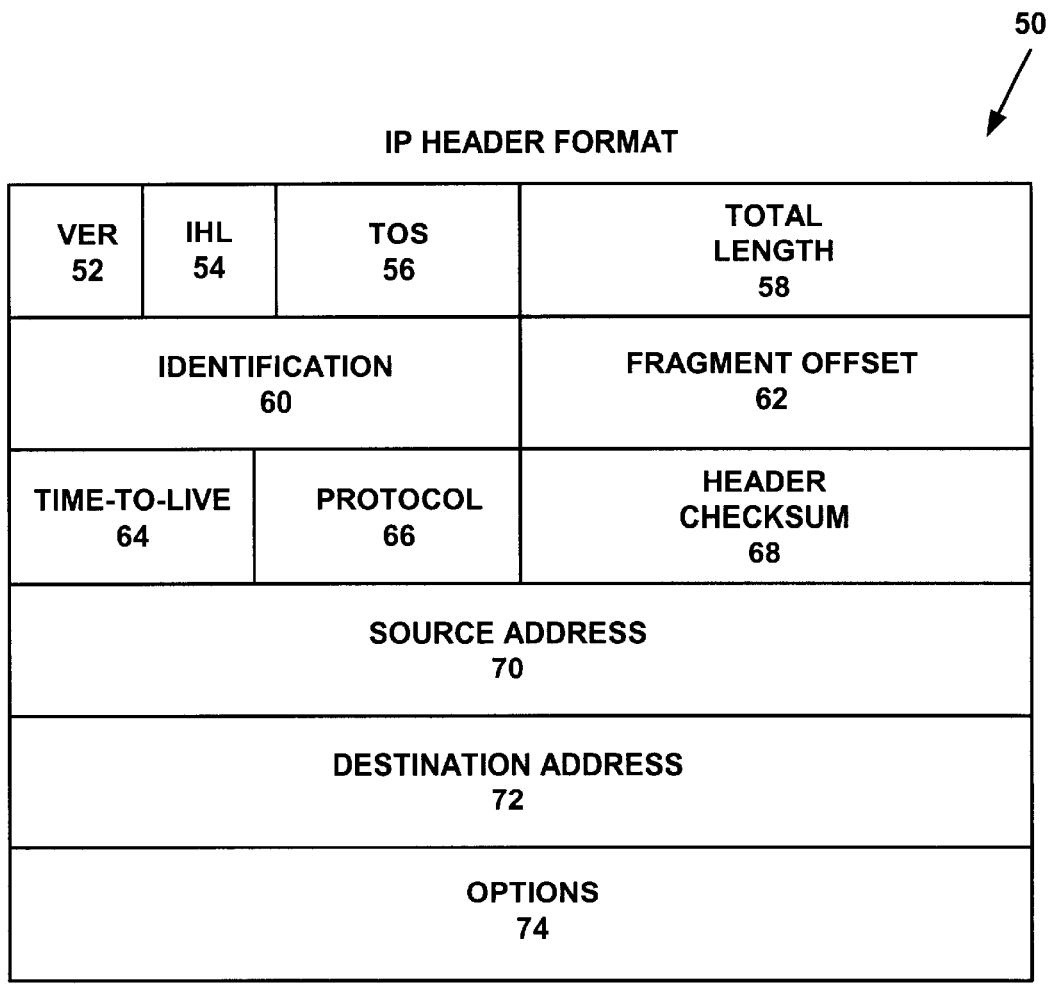
FIG. 1 is a block diagram illustrating an IP packet header.

FIG. 1 is a block diagram illustrating an IP packet header 50. The IP packet header includes a number of different fields. The version field 52 indicates an IP version, such as IPv4 or IPv6. The Internet Header Length ("IHL") field 54 indicates the length of the header. The Type-of-Service ("ToS") field 56 indicates a requested type of service. The total length field 58 indicates the length of everything in the IP packet, including the IP header 50. The identification-field 60 may be used for packet fragmentation. The fragment offset field 62 is also used for packet fragmentation. The Time-To-Live ("TTL") field 64 may be a hop count, which is used to limit the lifetime of the IP packet. The protocol field 66 indicates a protocol used with the IP packet. For example, TCP, User Datagram Protocol ("UDP"), Encapsulating Security Payload ("ESP"), and Authentication Header ("AH") are common protocols that may be used in conjunction with IP. Other protocols may be used as well. The header checksum field 68 can be used to verify the contents of the IP packet header 50. The source address field 70 may include a source IP address for a sending endpoint, and the destination address field 72 may include an IP address for a receiving endpoint. The options field 74 can be used for security, source routing, error reporting, debugging, time stamping or other information. IP data may be carried in the IP packet data portion, which is below the options-field 74.

The IP packet is sent over the network, and, using the destination device's IP address included in the header, appropriately routed to the destination device. An IP packet may travel through different devices and across different networks before reaching the destination device. The IP address is used to accurately route the packet across the networks and to the correct destination device.

Although IP provides a method for uniquely identifying devices across multiple networks, it does not provide a mechanism to assure that packets sent from a source device will be successfully received at the destination device. Packets may be lost during transmission across the networks due to different factors, such as data corruption, buffer overflow, equipment failure or other errors. TCP can be used in conjunction with IP to ensure reliable end-to-end transmission of the packets. Among other functions, TCP handles lost or corrupted packets, and it reassembles packets that arrive at their destination out of order. TCP/IP is one method of establishing a connection between the handset and media server, and many other Internet or network protocols also exist.

Another protocol that may be used to send data is Mobile IP, which is an extension of IP. While IP can be used to connect devices on separate networks, an IP address is usually associated with just one particular network. A wireless device may be assigned an IP address, which is associated with the wireless device's home network. During a communication session, however, the wireless device might roam to another network.

Mobile IP is an extension of the IP protocol that allows a "mobile" node to transparently move between different IP sub-networks ("subnets") and to still receive data addressed to the IP address associated with the mobile node's home network. While the mobile node dynamically changes its network connectivity, this is transparent to protocol layers above IP (e.g., TCP or UDP). Mobile IP is described in detail in the Internet Engineering Task Force Request for Comment 2002, C. Perkins, October 1996, which is incorporated herein by reference in its entirety, and in "Mobile IP: The Internet Unplugged," by J. D. Solomon, Prentice-Hall, 1998, ISBN-0-13-856246-6, which is incorporated herein by reference in its entirety.

Figure 2:
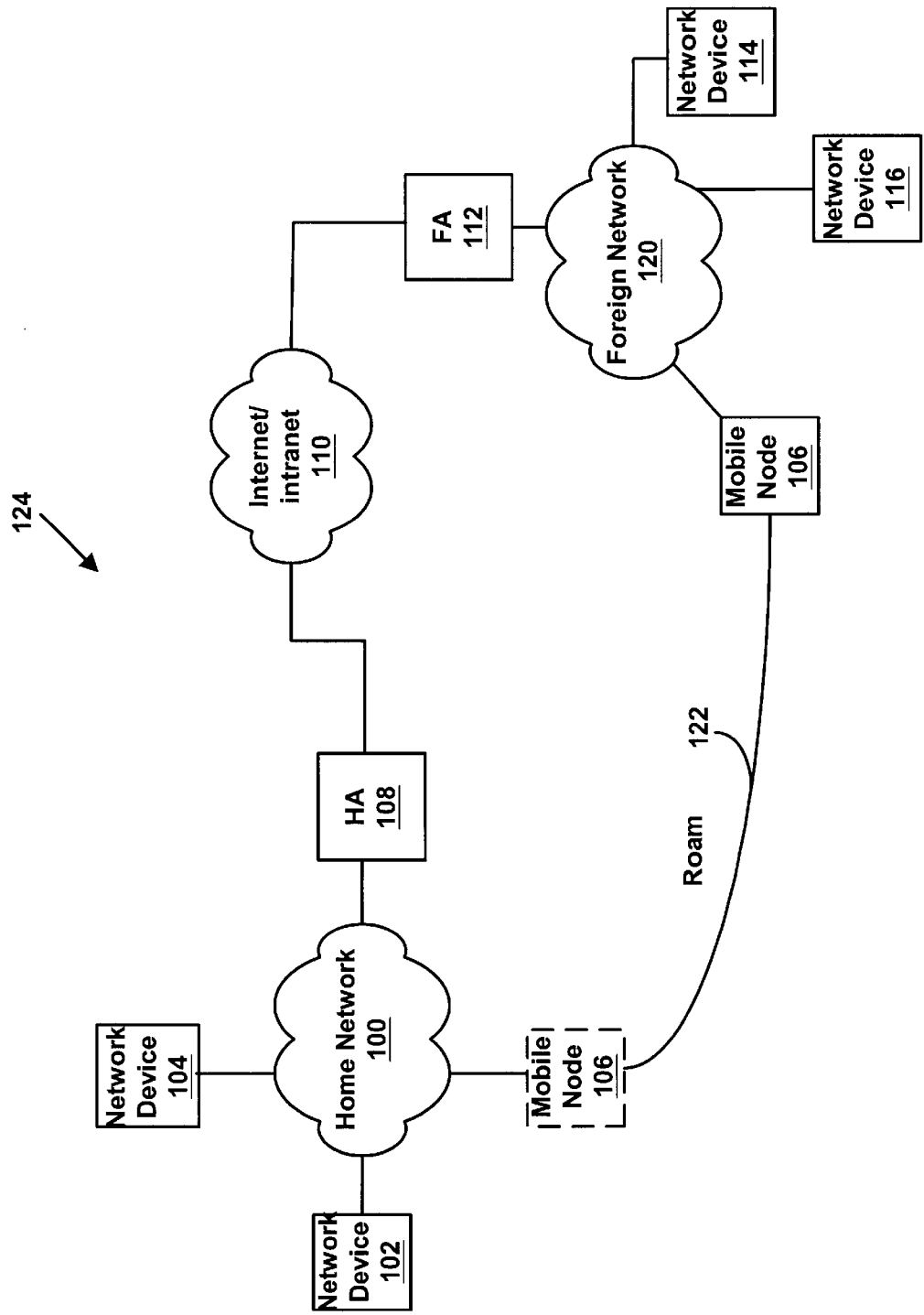
FIG. 2 is a block diagram illustrating an exemplary Mobile Internet Protocol system.

FIG. 2 is a block diagram illustrating an exemplary Mobile IP system 124. The Mobile IP system 126 includes two non-mobile network devices 102, 104 and a mobile network device ("mobile node") 106 connected to a home network 100. The home network 100, however, may include more or fewer non-mobile network devices. It may also include more than one mobile-network device. The mobile node 106 may preferably be any wireless device, such as a cellular phone, a personal digital assistant (PDA), a wirelessly equipped computer, or another device; however, it is also possible that the mobile node is a non-wireless device. The non-mobile network devices 102, 104 may be, for example, computers including network interface cards ("NICs") or other devices. The NICs interface with the home network 100 and provide connectivity to the home network 100.

In one embodiment, the home network 100 is a LAN, and the network devices 102, 104, 106 connected to the home network 100 communicate using the IEEE 803.2 Ethernet protocol. In this protocol, each network device 102, 104, 106 on the home network 100 is assigned a subnet network address, which is an Ethernet address of the type supported by the IEEE 803.2 protocol. The subnet network address provides a mechanism to identify each network device 102, 104, 106, and it is used to exchange data between the network devices 102, 104, 106 on the home network 100. The home network 100 is not limited to a LAN using the IEEE 803.2 protocol. Many different network types exist, and many different protocols and addressing schemes may be used to exchange data between devices on a network. These different network types and protocols may also be used.

The home network 100 connects to an external network 110, such as the Internet or an intranet, via a home agent ("HA") 108. The home agent 108 is a "gateway router" for the home network 100. As is known in the art, a gateway connects networks using different networking protocols or operating at different transmission capacities. As is also known in the art, a router translates differences between network protocols and routes data packets to an appropriate network node or network device. By connecting to the home network 100 network devices 102, 104, 106 on the home network 100 can exchange data with devices connected to the external network 110.

The subnet network address, such as an Ethernet address, assigned to each network device 102, 104, 106 on the home network 100, is generally not a globally routable address. Therefore, it may not support communication between a device on the home network 100 and a device connected to the external network 110. In order to communicate with devices connected to the external network 110, one or more devices on the home network 100 may also be assigned a global address. The global address may be used to identify the device when it is communicating with devices on external networks. For example, one or more devices connected to the home network 100 may each be assigned an IP address, which can be a globally routable address used to exchange data with devices connected to the external network 110.

While it is possible that the network devices 102, 104, 106 on the home network 100 are assigned a globally routable address in addition to their subnet network address, it is also possible that the network devices 102, 104, 106 on the home network 100 exchange data using an addressing scheme that supports communication with devices connected to the external network 110. In this case, the subnet network address may be globally routable, and it may be the same as the global address. For example, the home network devices 102, 104, 106 may communicate with each other using IP or another similar protocol. Since IP can be a globally routable address, it would not be necessary to assign the network 102, 104, 106 a global address in addition to their subnet address.

The mobile node 106 is depicted as a dashed box 106 connected to the home network 100, because the mobile node 106 may "roam" away from its home network 100 and connect to a foreign network 120. When the mobile node 106 roams away from its home network 100, it periodically transmits Mobile IP "agent solicitation" messages to foreign agents, such as the foreign agent ("FA") 112. The foreign agent 120 is foreign with respect to the mobile node's home network 100.

FIG. 2 also depicts a foreign network 120. The foreign network 120 includes two non-mobile nodes 114, 116. It is possible, however, that the foreign network may include a greater or fewer number of non-mobile nodes. The foreign network 100 may also include one or more mobile nodes for which the foreign network 120 serves as the home network, but no such mobile nodes are depicted in FIG. 2. A foreign agent 112 resides on a foreign network 120. The foreign agent 120, similar to the home agent 108, is a gateway router for the foreign network 120.

The foreign network network devices 114, 116 are assigned subnet network addresses on the foreign network 120. The subnet network address may be used for communication between devices connect to the foreign network 120. As was previously explained, it is possible that the subnet network addresses are not globally routable and that the network devices 114, 116 on the foreign network 120 are also assigned globally routable addresses. For example, one or more of the devices 114, 116 on the foreign network may also be assigned an IP address. However, it is also possible that the subnet network addresses (e.g., IP addresses) are globally routable and can be used to communicate with devices connected to the external network 110.

As the mobile node 106 travels away from its home network 100, it may connect to a foreign network 120. The roaming mobile node 106 listens for mobile IP "agent advertisement" messages from foreign agents (i.e., foreign gateway routers such as the foreign agent 112). The agent advertisement message indicates that the roaming mobile node 106 is now on a foreign network 120. When the roaming mobile node 106 receives an agent advertisement message from a foreign agent, such as foreign agent 112, the mobile node 106 registers with the foreign agent (e.g., foreign agent 112) and also with its home agent (e.g., home agent 108). The registration indicates that the mobile node 106 has roamed away from its home network 100 to a foreign network 120.

The mobile node 106 uses its home global address on the home network 100 to register with the foreign agent 112 and the home agent 108. After registration of the mobile node 106, the foreign agent 112 may accept data packets for the mobile node 106 at the specific home global address for the mobile mode 106 in addition to data packets for network devices 114, 116 on the foreign network 120. The foreign agent 112 may also assign a temporary subnet network address on the foreign network 120 to the mobile node 106.

Figure 3:
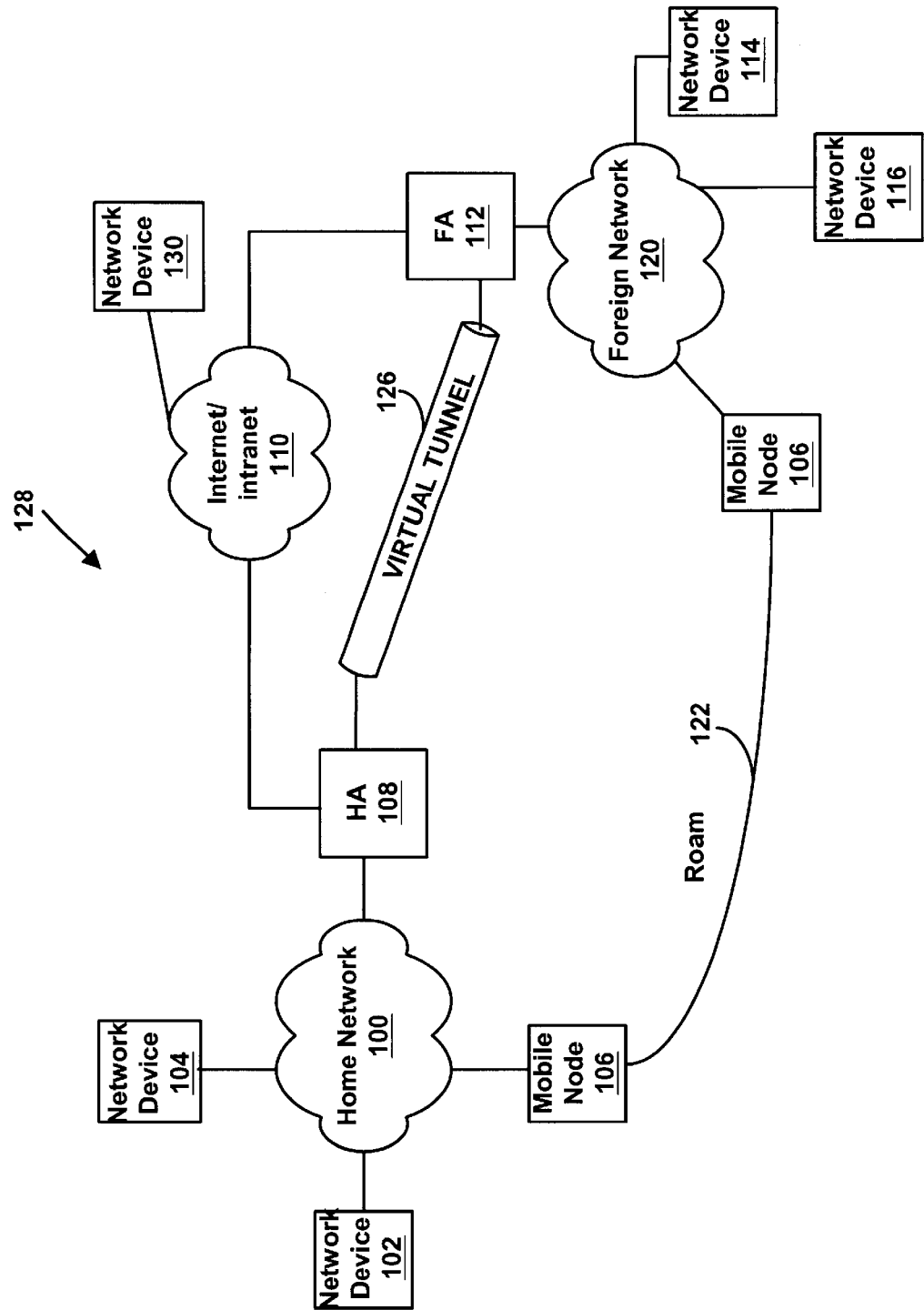
FIG. 3 is a block diagram illustrating exemplary Mobile Internet Protocol communications in the Mobile Internet Protocol system of FIG. 2.

FIG. 3 is a block diagram illustrating exemplary Mobile IP communications in an exemplary Mobile IP system 128. Once the mobile node 106 roams to the foreign network 112 and registers its current location (e.g., on the foreign network 112 and on the home network 100), the home agent 108 may create a "virtual tunnel" 126 to the foreign agent 112 via the external network 110. The virtual tunnel 126 is not an additional physical connection created between the foreign agent 112 and the home agent 108, but rather the virtual tunnel 126 represents a conceptual data path for transmitting data between the home agent 108 and the foreign agent 120. The virtual tunnel 126 can be created by encapsulating a data packet inside another data packet and by adding additional tunnel packet headers.

In one preferred embodiment of the present invention, IP-in-IP tunneling is used. IP-in-IP tunneling is described in more detail in the Internet Engineering Task Force Request for Comment 1853, W. Simpson, October 1995, which is incorporated herein by reference in its entirety. Tunneling and data encapsulation are also discussed in Internet Engineering Task Force Request for Comment 2003, C. Perkins, October 1996, which is incorporated herein by reference in its entirety, and in Internet Engineering Task Force Request for Comment 2004, C. Perkins, October 1996, which is incorporated by reference herein in its entirety. Other types of virtual tunnels, such as UDP tunneling or double IP-in-IP tunneling, can also be created, and these may also be used.

A network device 130 connected to the external network 110 may want to send data to the mobile node 106. While the network device 130 is shown generally connecting to the external network 110, it may actually be a computer or another type of device connected to a network, such as a LAN. The network may then provide the network device 130 with connectivity to the external network 110.

The network device 130 sends a data message addressed to the mobile node 106. This may be done, for example, by sending the mobile node 106 a packet addressed to its globally routable IP address. The packet travels through the external network 110 and is routed to the home agent 108. The home agent 108 accepts packets addressed to IP addresses for devices in its subnet, which is the home network 100. If the mobile node 106 were connected to the home network 100, the home agent 108 would forward the packet to the mobile node 106. However, the mobile node 106 is not connected to the home network 100. The mobile node 106 is connected to the foreign network 120, and the packet must be forwarded from the home agent 108 to the foreign network 120.

The mobile node 106 previously registered its new subnet location with the home agent 108 and with the foreign agent 112. The home agent 108 encapsulates the packet addressed to the mobile node 106 into a tunnel packet, which is sent to the foreign agent 112 through the virtual tunnel 126. When the foreign agent 112 receives the tunnel packet, it removes the tunnel packet header and routes the packet to the mobile node 106.

The mobile node 106 periodically transmits "keep-alive" messages using ICMP messages. The messages may include standard ICMP messages and other ICMP messages that are unique to Mobile IP. The mobile node 106 can roam to foreign networks other than the foreign network 120 depicted in FIG. 3, and the mobile node 106 can register with other foreign agents using mobile IP. This allows the mobile node 106 to travel to more than one foreign network.

Internet Protocol Security

Although IP provides an addressing scheme for sending packets between a source device and a destination device, it does not ensure that the source device and the destination device will be the only devices that access and read the data portion of the IP packet. Other devices may intercept the IP packet and read its data portion. In order to counter other devices from intercepting IP packets and reading their data portion, additional security protocols may be employed during IP communications to provide security for the IP packets.

Internet Protocol Security ("IPsec") is one method that may be used to provide security for IP packets. IPsec is described in further detail in "Security Architecture for the Internet Protocol," Internet Engineering Task Force Request for Comment 2401, Kent et al., November 1998, which is incorporated herein by reference in its entirety; and, it is described in further detail in "Security Properties of the IPsec Protocol Suite," Internet Engineering Task Force IP Security Working Group Draft, A. Krywaniuk, July 2001, <draft-krywaniuk-ipsec-properties-00.txt>, which is incorporated herein by reference in its entirety. IPsec generally improves message authentication, message integrity and message confidentiality for IP packets moving between a source endpoint and a destination endpoint. Starting from a state in which no connection exists between two endpoints, a Security Association ("SA") can be established based upon IP such that each endpoint trusts the security of the connection and an identity of each endpoint is authenticated to the other endpoint.

IPsec generally defines two security services, and each security service has an associated header that is added to an IP packet using that service. The two security services are an Authentication Header ("AH") and an Encapsulating Security Payload ("ESP") header. While IPsec defines these two security services, it is possible that a fewer or greater number of security services can also be used with IPsec.

The AH provides authentication and integrity protection for IP packets. The Authentication Header is described in more detail in "IP Authentication Header," Internet Engineering Task Force Request for Comment 2402, Kent et al., November 1998, which is incorporated herein by reference in its entirety.

Figure 4:
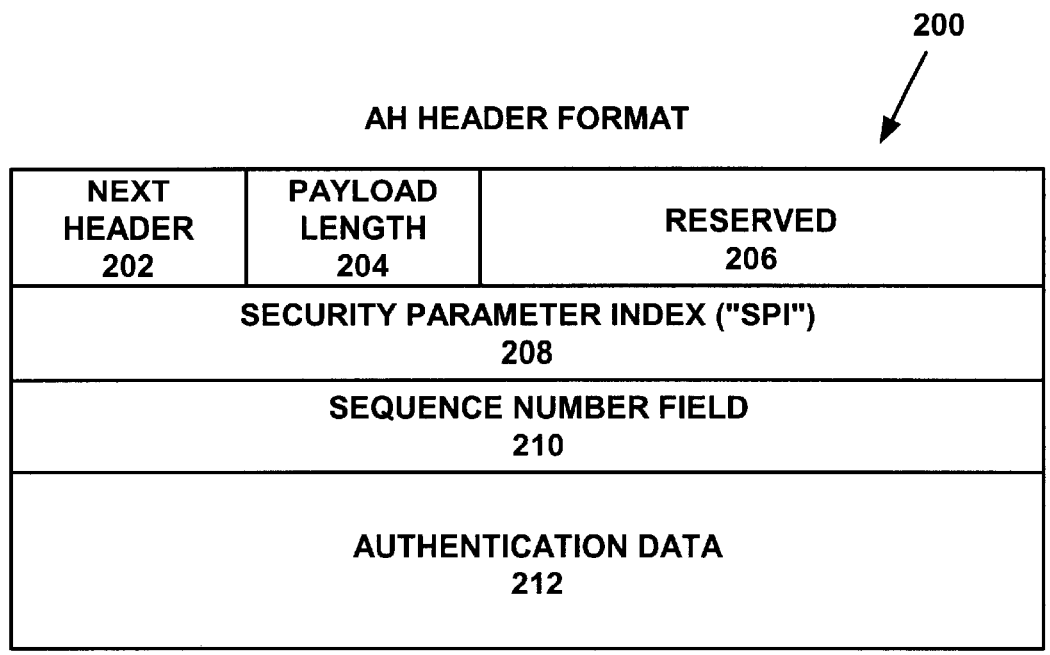
FIG. 4 is a block diagram illustrating an Internet Protocol security Authentication Header.

FIG. 4 is a block diagram illustrating an Internet Protocol security Authentication Header 200. The next header field 202 is an 8-bit field that identifies the type of the next payload after the AH. The payload length field 204 specifies the value of an AH in 32-bit words (i.e., 4-bytes). The reserved field 206 is a 16-bit field reserved for future use. The Security Parameters Index ("SPI") field 208 is an arbitrary 32-bit value that, in combination with a destination IP address and a security protocol (e.g. AH or ESP), uniquely identifies a SA for the data packet. The sequence number field 210 is an unsigned 32-bit field including a monotonically increasing counter value as a sequence number. An authentication data field 212 is a variable length field that includes an Integrity Check Value ("ICV") for a packet.

The ESP provides confidentiality as well as authentication and integrity protection. The Encapsulating Security Payload is described in more detail in "IP Encapsulating Security Payload (ESP)," Internet Engineering Task Force Request for Comment 2406, Kent et al., November 1998, which is incorporated herein by reference in its entirety.

Figure 5:
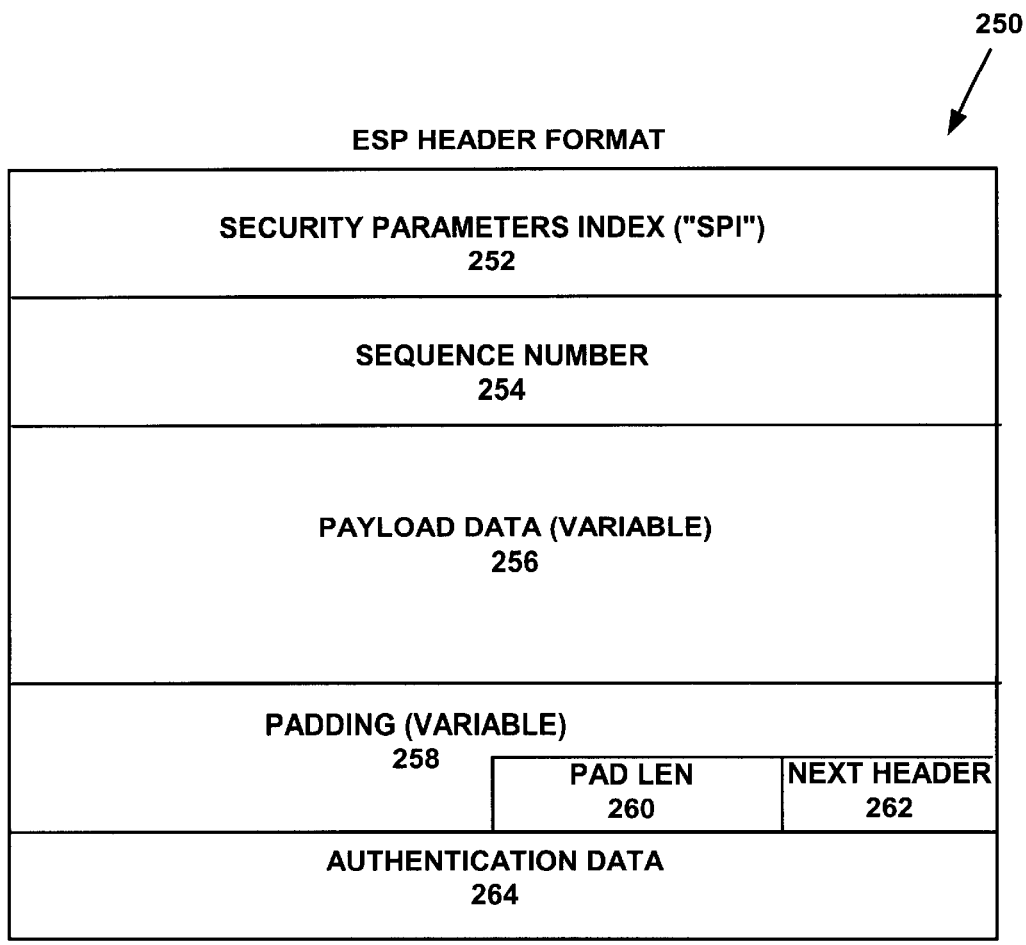
FIG. 5 is a block diagram illustrating an Encapsulating Security Payload packet format.

FIG. 5 is a block diagram illustrating an ESP packet format 250. A SPI-field 252 is an arbitrary 32-bit value that, in combination with a destination IP address and a security protocol (e.g. AH or ESP), uniquely identifies a SA for the packet. A sequence number-field 254 is a 32-bit field that includes a monotonically increasing counter value as a sequence number. A payload data-field 256 is a variable length field including data described by the next header field 262. A padding-field 258 is used with the payload data-field 266 for encryption. A pad length-field 260 indicates a number of pad bytes immediately preceding it. A next header-field 262 is an 8-bit field that includes a type of data included in the payload data-field 256. An authentication data-field 264 is a variable length field including an Integrity Check Value ("ICV") computed over the whole ESP header 250 minus the authentication data-field 264.

The IPsec protocol headers are identified in the protocol field 66 of the IP packet header 50. An IPsec protocol header specifies a protocol type (i.e., AH or ESP) and includes a numerical value called the Security Parameter Index ("SPI"). The SPI is a unique identifier associated with a SA by a receiving endpoint. The identifying information is used by a receiving endpoint to help it correctly associate an IP packet with a SA. The association of an IP packet with a SA allows proper IPsec processing.

The IPsec services can be applied in one of two modes, a "transport mode" or a "tunnel mode." In the transport mode generally only the IP packet's data is encrypted. The IP packet is routed to the destination devices using a destination address (e.g., the IP destination address 72). In the transport mode the destination IP address and the source IP address may both be "visible" (i.e., not encrypted) to other devices on the network. As a consequence, another device may be able to monitor the number of packets sent between a source device and a destination device. However, since the data is encrypted, the device ordinarily will not be able to determine the contents of the data in the IP packets. Once the transport mode packet reaches its final destination, the destination device performs the IPsec processing. For example, the destination device may decrypt the data carried in the IP packet according to an agreed encryption method.

In the tunnel mode generally the entire IP packet is encrypted, and it is sent along a virtual tunnel to the destination device. A virtual tunnel can be formed using a router or other network device that acts as an IPsec proxy for the source device and the destination device. The source device sends an IP packet to a source device endpoint. The source device endpoint encrypts the IP packet, and it places the encrypted packet into a new IP packet. The new IP packet is then sent through the network to a destination device endpoint. The destination device endpoint decrypts the original IP packet, and it forwards that packet to the destination device. Using this mode, an attacker can only determine the endpoints of the tunnel. The attacker cannot determine the actual source and destination addresses of the tunneled packet, and, therefore, the attacker cannot accurately determine how many packets are being sent between two devices.

Figure 6:
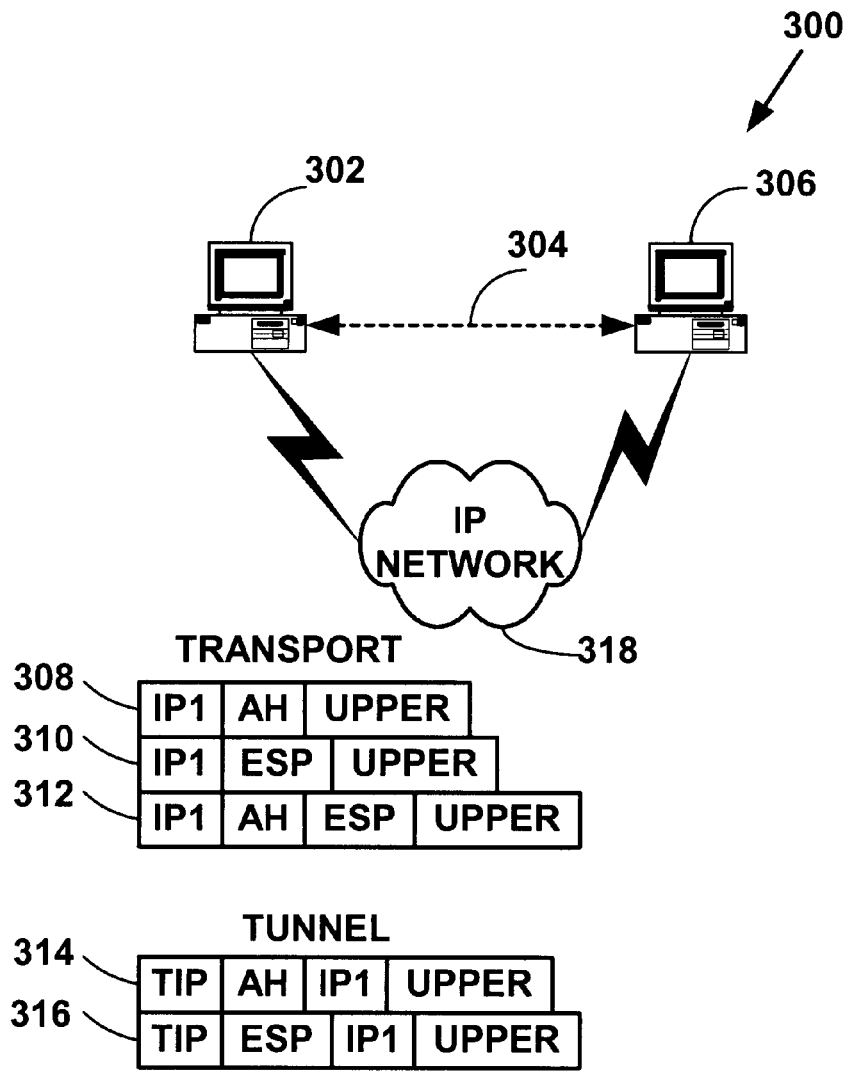
FIG. 6 is a block diagram illustrating various end-to-end security configurations between two endpoints across an Internet Protocol network.

FIG. 6 is a block diagram illustrating various end-to-end security configurations 300 between two endpoints across an IP network 318 (e.g., the Internet or an intranet) using AH, ESP and combinations thereof, in the transport and tunnel modes. A first end point 302 has a secure connection 304 to a second endpoint 306. A first exemplary data packet 308 includes a first IP address ("IP1") in a first IP header, an AH header and upper level protocol data. A second exemplary data packet 310 includes a first IP address, an ESP header and upper level protocol data. A third exemplary data packet 312 includes a first IP address, an AH header, an ESP header, and upper level protocol data. The exemplary data packets 308, 310 and 312 are used in the transport mode. One type of data packet layout is typically selected (308, 310 or 312) for the transport mode depending on the type of security desired.

In the tunnel mode, a fourth exemplary data packet 314 includes a tunnel IP header with a tunnel IP address ("TIP"), an AH header, an original IP header with a first IP address ("IP1") and upper level protocol data. A fifth exemplary data packet 316 includes a tunnel IP header with a tunnel IP address, an AH header, an original IP header with a first IP address and upper level protocol data. One type of exemplary data packet 314 or 316 is ordinarily selected for the tunnel mode depending on the security desired.

IPsec protocols establish and use a Security Association ("SA") to identify a secure virtual connection between two endpoints. A SA is a unidirectional connection between two endpoints that represents a single IPsec protocol-mode combination. Two termination endpoints (i.e., network devices for the transport mode, or intermediate devices for the tunnel mode) of a single SA define a secure virtual connection that is protected by IPsec services. One of the endpoints sends IP packets, and the other endpoint receives them. Since a SA is unidirectional, a minimum of two SAs are required for secure, bi-directional communication. It is also possible to configure multiple layers of IPsec protocols between two endpoints by combining multiple SAs.

In addition to defining a security service (i.e., AH, ESP) and a mode (i.e., tunnel or transport), IPsec allows the use of many different methods for performing encryption, authentication and other functions. These various parameters can also be defined in a SA. For example, the SA may indicate which encryption method and which keys will be used in an IPsec communication session. Before successful communication can occur between two devices in an IPsec communication session, the particular SA for that session should be determined.

The process of establishing an IPsec SA involves negotiation and authentication. During negotiation, the two endpoints agree to which security protocol and mode to use. They also agree on other algorithms to use, such as, specific encryption techniques, associated parameter values and a SPI assignment for each SA that was established. The authentication ensures that each endpoint can trust the identity of the other endpoint during negotiation, and also after the SA is established.

A number of standards have been proposed for protocols that establish SAs including an Internet Security Association and Key Exchange Protocol ("ISAKMP"), an Oakley Protocol ("Oakley"), and an Internet Key Exchange ("IKE") protocol, which incorporates ISAKMP and Oakley. ISAKMP is described in further detail in "Internet Security Association and Key Management Protocol ("ISAKMP")," Internet Engineering Task Force Request for Comment 2408, Maughan et al., November 1998, which is incorporated herein by reference in its entirety. Oakley is described in further detail in "The OAKLEY Key Determination Protocol," Internet Engineering Task Force Request for Comment 2412, H. K. Orman, November 1998, which is incorporated herein by reference in its entirety. IKE is described in further detail in "The Internet Key Exchange (IKE)," Internet Engineering Task Force Request for Comment 2409, Harkins et al., November 1998, which is incorporated herein by reference in its entirety.

Using IKE, for instance, a SA negotiation is carried out as a sequence of signaling exchanges between two endpoints. A first endpoint proposes a security protocol and encryption algorithm, and a second endpoint accepts or counter-proposes. Once the signaling is complete and both endpoints have agreed to the negotiated details, relevant security parameter information is exchanged and the endpoints are ready to send or receive on a single unidirectional SA. Part of the signaling includes exchange of authentication information, using a Certificate Authority ("CA").

Authentication is based on a trusted third-party called a Certificate Authority. Each endpoint that participates in IPsec generates a public/private encryption key pair, and has its public key "notarized" by the CA. The CA binds an endpoint's IP address to its public key, generates a certificate and returns it to an owner of the key. Thus, IP addresses are one "security name space" used for binding public keys to their owners.

During SA negotiation, one endpoint supplies another endpoint with its certificate along with a signature that is encrypted with its private key. The certificate and signature are verified with a public key. A recipient (one at each endpoint) uses a sender's public key from its certificate to validate the signature and the sender's right to use its IP address. Since only the sender has access to the private key, the recipient, once it has verified the signature, is certain of the initiator's "identity." The identity may be determined by the IP address of the initiator, as IP addresses form the security name space used to bind public keys to their owners. However, other security name spaces could also be used using other than an IP address for an initiator's identity. Certificates are issued with a "Time-to-Live" value, after which they expire and become invalid. The result of negotiation and authentication is a secure connection for one unidirectional SA. A second SA for bi-directional communications may be registered in a similar manner.

Policy Service

IPsec can be applied to various different communication sessions, and it can be used in communication sessions between various different devices. In order to properly establish an IPsec session, the devices participating in the IPsec session should generally agree on the parameters to be used during the IPsec session. The parameters can be specified, for example, in a policy to be applied to that IPsec session. Then, the devices can apply the parameters to communications during the IPsec session.

For example, a tunnel endpoint, such as a FA or an HA, may receive packets from a variety of different sources, and these packets may have to be processed differently. For example, a tunnel endpoint may receive some packets that are part of an IPsec communication session, and it may receive other packets that are not part of an LPsec communication session. For the packets that are not part of an IPsec communication session, the tunnel endpoint may simply route the packet according to its IP destination address; however, for packets that are part of an IPsec communication session, the tunnel endpoint may perform various IPsec processing functions.

In one example of an IPsec processing function, a tunnel endpoint may receive an IP packet from a source device. The tunnel endpoint may then encrypt the packet and place it in the data portion of a new IP packet that is sent to the other tunnel endpoint. The other tunnel endpoint may then receive the IP packet, decrypt the data portion of the new packet in order to retrieve the original packet and forward the original packet to the destination device.

A tunnel endpoint may additionally support more than one IPsec communication session. Each IPsec session may use different security protocols, different encryption keys or other different parameters. Therefore, a tunnel endpoint may have to apply different processing functions to packets in different IPsec communications sessions. For example, one IPsec session may use ESP, while another IPsec session may use a combination of ESP and AH. The two sessions may use different encryption algorithms; they may use different keys; or, they may have other different parameters. In order to properly service an IPsec packet, the tunnel endpoint should apply the correct processing functions for the IPsec packet.

For an IPsec communications session, each tunnel endpoint ordinarily stores a policy and a filter for that IPsec session. The policy generally includes information on how to process an IPsec packet for that IPsec session. For example, the policy may include information such as the types of services to use (e.g., AH, ESP or both), the types of encryption to use, the lifetime of keys, the domain of interpretation ("DOI") rules to negotiate the type of service or other information. The policy file may also define other attributes of the IPsec session. A filter can be used to identify a subset of packets from a larger set of packets, such as by identifying packets that need IPsec processing. For example, the filter can generally specify packets that need IPsec service by maintaining a list of FA-HA pairs that correspond to IPsec sessions. The filter may also identify a policy to use for an IPsec packet corresponding to a FA-HA session, or it may specify other information.

When a tunnel endpoint receives a packet, the tunnel endpoint determines how to process the packet. The tunnel endpoint may maintain a filter list. The filter list can cover possible IPsec sessions corresponding to FA-HA pairs. The pairs may be specified in a variety of different manners, but preferably they are based on the IP addresses of the devices. After a tunnel endpoint receives a packet, it can check the source and destination addresses of the packet against the FA-HA pairs in its filter list. If the filter list includes a filter for the IP packet, then the tunnel endpoint may process the packet. However, if the filter list doesn't include a filter for the packet, then the tunnel endpoint may simply pass the IP packet through without applying a policy and without performing IPsec processing functions.

In one exemplary operation, a mobile node roams to a foreign network. The mobile node sends packets to the foreign network's foreign agent. The FA reads the source IP address, the IP protocol type, the source and destination ports, and the destination IP address of the packet. Then, based on the IP addresses, the FA searches its list of filters to determine if the IP packet needs IPsec processing and which policy to apply. Based on the filter list, the FA determines that the packet needs IPsec processing. Then, the FA processes the packet, for example according to a policy indicated by the filter. Next, the FA sends the packet through the tunnel to the mobile node's HA. The HA receives the packet from the FA, and the HA searches its filter list to determine if the incoming packet needs IPsec processing. Based on the filter list the HA can determine that the packet needs IPsec processing and a policy to apply to the packet. Then, the HA can process the packet according to the policy indicated by the filter.

The mobile node may roam to more than one different foreign network, and each foreign network may have its own FA. In order to support IPsec communications, multiple FA-HA pairs should be identified. A policy and filter for the FA-HA pair should be stored by the FA, and a corresponding policy and filter for the FA-HA pair should also be stored by the HA. Statically defining the FA-HA pairs and storing their filters and policies can create an inordinately large amount of information that is stored by the FAs and the HA. This can also lead to a delay in processing packets, as the FA or HA must search through the large number filters to determine whether to apply IPsec processing to a received packet.

In order to provide greater scalability and increased processing efficiency, one or more policies for a FA-HA pair can be dynamically linked and one or more filters dynamically created. For example, a policy template may be created for a mobile node. The policy template may be configured in the mobile node's home network, and it may be stored by the HA. Alternatively, the policy template may be stored in an Authentication, Authorization and Accounting ("AAA") Server, which can be accessed by the HA, or the policy template may be stored in another location. In addition to being stored on the home network, the policy template may also be stored in the foreign network. For example, the foreign agent may also store the policy template.

The policy template may store parameters to be used in IPsec communication between the FA and the HA. When the mobile node accesses the foreign network, the FA engages in an authentication procedure with the AAA. The AAA may then indicate to the FA that IPsec should be used for communication with the mobile node. Then, a policy template can be dynamically linked to the FA, and the policy template can be used to specify parameters for communications between the mobile node and the HA. For example, the FA may create a dynamic linkage to the policy template by creating a policy instance. A policy instance can be an instance of the policy template as applied to the specific association between a PDSN and HA. While the policy template may specify various parameters between the FA/PDSN and HA, the FA and HA may additionally negotiate other parameters that are specific to that session involving the mobile node. For example, the FA and HA may additionally negotiate the dynamic pre-shared key used in IKE authentication for an IPSec policy. Of course, other parameters may also be negotiated. These additional parameters may then become part of the policy instance. Thus, a policy instance can be derived from the policy template as well as negotiated parameters.

A policy template can be created for a specific FA-HA pair corresponding to a specific mobile node. However, it is also possible that the policy template can correspond to a particular FA-HA pair. Additionally, a policy template may be used for more than one mobile node, or it may be used for more than one FA-HA pair.

Figure 7:
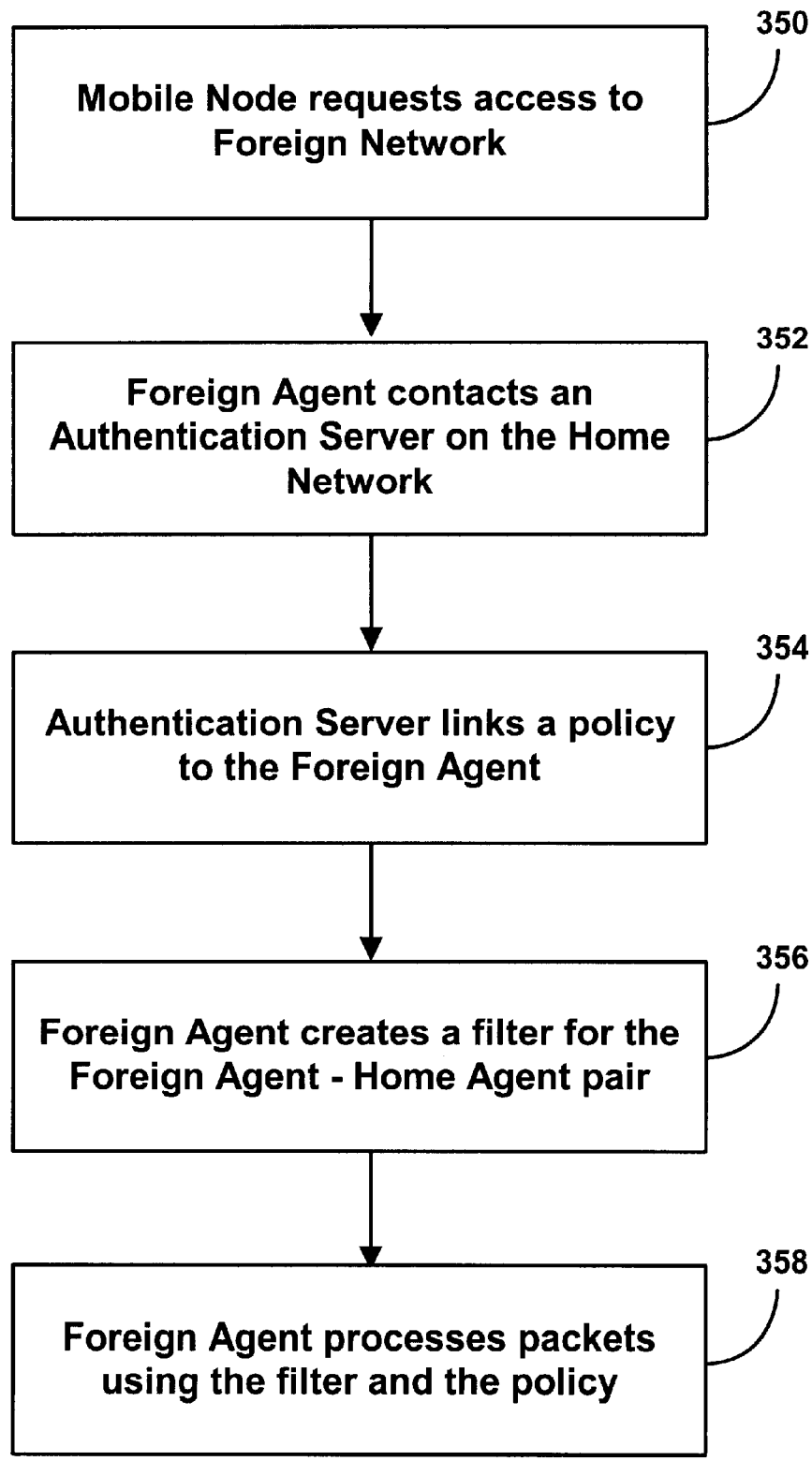
FIG. 7 is a flowchart of a process for dynamically linking a policy and creating a filter.

FIG. 7 is a flowchart illustrating one exemplary process for dynamically linking the policy to a FA and dynamically creating a filter. At Step 350, a mobile node requests access to a foreign network. At Step 352, the foreign agent on the foreign network contacts an authentication server on the mobile node's home network. If the mobile node is authorized to connect to the home network and needs security service, the authentication server then conveys to the foreign agent that IPsec service is needed for the mobile node, shown at Step 354. The foreign agent dynamically links to a policy template and it can negotiate additional parameters with the HA. Then, at Step 356, the foreign agent creates a filter for the FA-HA pair. Likewise, although not shown in FIG. 7, the home agent also creates a filter for the FA-HA pair, and it can use the policy already defined in the home network for the mobile node. Finally, at Step 358, the foreign agent processes packets using the dynamically linked policy and the dynamically created filter.

With continued reference to FIG. 3, a mobile node 106 roams to a foreign network 120 and wants to communicate with its home network 100. The mobile node 106 first initiates a connection with the foreign network 120, for example by communicating with the foreign network's foreign agent 112. This may be done using a variety of different methods. For example, the mobile node 106 may dial into a cellular network and attempt to establish a Mobile IP session by sending the FA 112 (e.g., a PDSN) a Mobile IP registration request. The Mobile IP registration request may request that the FA 112 establish a tunnel with the HA 108. The FA 112 may then connect with an AAA server (not shown). The AAA server generally belongs to the home network 100 of the mobile node 106, and it can be used to determine if the mobile node 106 has permission to connect to the home network 100. If the mobile node 106 has permission to connect to the home network 100, the HA 108 may return a registration response message including the home IP address of the mobile node. The mobile node 106 can then use that IP address wherever it roams.

In addition to determining if the mobile node 106 has permission to connect to the home network 100, the AAA Server may also determine if the mobile node 106 needs security (e.g., IPsec) when it communicates with the home network 100. The security policy for the mobile node's communication with the HA 108 is ordinarily defined in the AAA Server, and the mobile node 106 generally uses the security policy defined in the AAA Server. The AAA Server usually only specifies whether the mobile node 106 needs security; it generally doesn't specify specific parameters to be used. For example, the AAA Server may indicate that the mobile node 106 should use IPsec, but it generally would not indicate specific parameters for the IPsec session. If the AAA Server determines that the mobile node 106 needs to use IPsec, it informs the FA 112. The FA 112 then initiates a connection with the HA 108, and the HA can dynamically link a security policy template to the FA 112. Then, the FA 112 and the HA 108 can negotiate other IPsec parameters for that session in accordance with the specific parameters specified in the security policy. For example, the FA 112 and HA 108 may an appropriate negotiation procedure, such as IKE, to negotiate the other parameters for communication between the FA 112 and the HA 108.

The FA 112 may also dynamically create a filter for the FA-HA pair, which can then be stored in a list of filters maintained by the FA 112. Incoming packets to the FA 112 are then checked against the filters maintained by the FA 112. If a filter exists for the packet, then the FA 112 may apply the appropriate processing; however, if a filter does not exist, then the FA 112 may simply pass the packet through the node. The HA 108 may also dynamically create a filter for the FA-HA pair, and it may use this filter to accurately process packets received from the FA 112 and corresponding to the mobile node 106.

Since an IPsec security association is unidirectional, it is possible that two or more security associations are created. For example, the FA-HA pair may create one tunnel for packets sent from the FA 112 to the HA 108, and it may create another tunnel for packets sent from the HA 108 to the FA 112. One or more policy templates may be linked to the FA 112 for each tunnel created. For example, one policy template may specify a set of parameters for the IPsec session, while a second policy template may specify additional parameters. Additionally, one or more filters may also be created for each tunnel. It is also possible that a tunnel is only created in one direction.

Once the mobile node 106 roams away from the foreign network 120, the tunnel between the FA 112 and the HA 108 may be terminated. The filter for the FA-HA pair corresponding to the mobile node 106 may then be removed from the FA's filter list. Removing the filter from the FA's filter list may improve the performance of the FA 112 and speed the processing of packets. For example, incoming packets to the FA 112 should be checked against the FA's filter list to determine if the packet needs special processing (e.g, IPsec processing). If the FA 112 maintains a large list of filters, then checking an incoming packet against each filter in the list can be a time-consuming process. By dynamically creating a filter for a FA-HA pair and removing that filter when the connection ceases to be active, the FA's filter list may include only filters for active connections. This can decrease the number of filters stored in the list and increase the efficiency of processing packets.

A similar procedure may be used for by HA 108 to remove the filter from its list of filters. When the mobile node 106 roams away from the FA 112, the HA 108 may remove the filter for the FA-HA pair. For instance, the HA 108 may remove the filter when the mobile node registers a new "care-of-address" in a Mobile IP session or otherwise indicates it is no longer using the foreign network's FA 112. By removing filters that are no longer active, the HA 108 can increase its efficiency in processing incoming packets.

In another embodiment, more than one policy or filter may be defined for a FA-HA pair. In one example, an IPsec session may have policies for Phase__1 and for Phase__2. The filters for these phases may be created when the mobile node connects to the FA, which then relays the Mobile IP Registration Request to the HA and gets a response in return. The filter for Phase__1 may include parameters to specify ISAKMP packets between the FA and the HA. For example, it may specify the IP address for the FA, the IP address for the HA, the IP protocol and the Source and Destination Ports. The filter for Phase__2 may include parameters to specify tunnel packets between the FA and the HA. For example, it may include the IP address for the HA, the IP address for the FA and a protocol type (e.g., IP-in-IP, generic routing encapsulation ("GRE"), or another type). In another example, it may include the IP address for the HA, the IP address for the FA, a protocol type (e.g., UDP, TCP, etc . . . ), and source and destination ports.

While the preceding examples illustrate dynamically linking policies and dynamically creating filters in an IPsec environment, the policy-base services may be used in a variety of different systems. For instance, they may be used in a Network Address Translation (NAT)/Port Address Translation (PAT) system. Additionally, they may be applied in a firewall environment, quality of service ("QoS") environment, or in another system. In QoS, for example, the policy template may include default priority and policing information. The AAA may pass a Diffserv marking and policing information to the PDSN. The PDSN may then create an instance of a policy from the policy template, or it may choose to use the policy template from the mobile user.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments in hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method to dynamically provide Internet Protocol security policy service, comprising the steps of:

receiving a connection request sent from a mobile node to a foreign agent, wherein the mobile node uses Mobile Internet Protocol;

obtaining at least one policy template for the mobile node, wherein the at least one policy template includes processing information for Internet Protocol security packets sent between the foreign agent and a home agent for the mobile node;

negotiating Internet Protocol security parameters with the home agent;

creating at least one filter, wherein the at least one filter identifies data packets traveling between the home agent and the foreign agent to receive Internet Protocol security processing, and wherein the at least one filter identifies the at least one policy template to apply to the data packets receiving Internet Protocol security processing; and storing the at least one filter in a list of active filters maintained by the foreign agent, wherein the list of active filters identifies data packets in a plurality of active Internet Protocol security sessions between the foreign agent and respective home agents of other mobile nodes that are registered with the foreign agent.

2. The method of claim 1 further comprising a computer readable medium having stored therein instruction for causing a processor to execute all the steps of the method.

3. The method of claim 1, further comprising the steps of:

terminating a connection with the mobile node; and removing the at least one filter from the list of active filters.

4. The method of claim 1, wherein the security parameters are negotiated using Internet Key Exchange.

5. The method of claim 1, wherein the security parameters are negotiated using Internet Security Association and Key Management Protocol.

6. The method of claim 1, wherein the at least one policy template specifies a type of encryption.

7. The method of claim 1, wherein the at least one policy template specifies a lifetime of a key.

8. The method of claim 1, wherein the at least one policy template specifies at least one rule used to negotiate the type of Internet Protocol security service.

9. The method of claim 1, wherein the at least one filter includes a first filter and a second filter; and wherein the first filter includes parameters to specify end points for Internet Security Association and Key Management Protocol packets, and wherein the second filter includes parameters to specify packets that need Internet Protocol security service.

10. The method of claim 1, wherein the at least one policy template includes information for a Network Address Translation/Port Address Translation application.

11. The method of claim 1, wherein the at least one policy includes information for a firewall application.

12. The method of claim 1, wherein the at least one policy comprises a plurality of policies.

13. The method of claim 1, wherein the at least one filter comprises a plurality of filters.

14. A method to dynamically provide policy service to a mobile node, comprising the steps of:

receiving an authentication request sent from a foreign agent on a foreign network to a home agent on a home network, wherein the authentication request indicates a mobile node roaming from the home network to the foreign network, and wherein the mobile node uses Mobile Internet Protocol;

determining whether the mobile node needs Internet Protocol security for packets sent between the foreign agent and the home agent;

informing the foreign agent that the mobile node needs Internet Protocol security for data packets sent between the home agent and the foreign agent; and linking at least one security policy template for the mobile node to the home agent, wherein the security policy template specifies parameters to be used in Internet Protocol security communications between the foreign agent and the home agent;

creating a filter wherein the filter identifies packets traveling between the home agent and the foreign agent to receive Internet Protocol security processing, and wherein the filter identifies the policy template to apply to the packets receiving Internet Protocol security processing; and storing the at least one filter in a list of active filters maintained by the home agent, wherein the list of active filters identifies data packets in a plurality of active Internet Protocol security sessions between the home agent and respective foreign agents of other mobile nodes.

15. The method of claim 14 further comprising a computer readable medium having stored therein instruction for causing a processor to execute all the steps of the method.

16. The method of claim 14, further comprising the step of:

negotiating Internet Protocol security parameters with the foreign agent.

17. The method of claim 16, wherein the Internet Protocol security parameters are negotiated using Internet Key Exchange.

18. The method of claim 16, wherein the Internet Protocol security parameters are negotiated using Internet Security Association Key Management Protocol.

19. The method of claim 16, wherein the Internet Protocol security parameters are negotiated using the OAKLEY protocol.

20. The method of claim 14, further comprising the step of:

determining the mobile node has roamed off the foreign network; and removing the filter from the home agent filter list.

21. The method of claim 14, wherein determining whether the mobile node needs Internet Protocol security further comprises accessing an authentication, authorization and accounting server.

22. A method for providing policy service in an Internet Protocol security application, comprising the steps of:

receiving a request from a mobile node roaming to a foreign network to establish a secure connection to a home network, wherein the mobile node uses Mobile Internet Protocol;

authenticating the mobile node with the home network;

receiving an indication to use Internet Protocol security for packets sent between a home agent on the home network and a foreign agent on the foreign network;

linking a policy for the mobile node to the foreign agent, wherein the policy identifies processing information for Internet Protocol security packets sent between the foreign agent and the home agent;

negotiating Internet Protocol security parameters with a home agent to create a virtual tunnel between the foreign agent and the home agent;

creating a filter for the mobile node, wherein the filter can be used to identify packets traveling between the foreign agent and the home agent that use Internet Protocol security; and storing the at least one filter in a list of active filters maintained by the foreign agent, wherein the list of active filters identifies data packets in a plurality of active Internet Protocol security sessions between the foreign agent and respective home agents of other mobile nodes that are registered with the foreign agent.

23. The method of claim 22 further comprising a computer readable medium having stored therein instruction for causing a processor to execute all the steps of the method.

24. The method of claim 22, further comprising the steps of:

receiving a packet;

searching the filter list to determine whether to apply Internet Protocol security processing to the packet; and processing the packet based at least in part on information included in the policy.

25. The method of claim 22, further comprising the step of:

determining the mobile node has roamed away from the foreign network; and removing the filter from the filter list.

26. The method of claim 22, wherein the policy identifies a type of Internet Protocol security encryption to use in sending packets through the virtual tunnel.

27. The method of claim 22, wherein the policy specifies a lifetime of a key used in sending packets through the virtual tunnel.

28. The method of claim 22, wherein the policy specifies domain of interpretation rules used to negotiate a type of service used to send packets through the virtual tunnel.

29. The method of claim 22, wherein the mobile node is a wireless computer, a personal digital assistant or a mobile phone.

* * * * *